US 11,323,308 B2

United States Patent
Hugar et al.

(10) Patent No.: US 11,323,308 B2
(45) Date of Patent: May 3, 2022

(54) CORE ISOLATION FOR LOGICAL TUNNELS STITCHING MULTI-HOMED EVPN AND L2 CIRCUIT

(71) Applicant: Juniper Networks, Inc., Sunnyvale, CA (US)

(72) Inventors: Channasangamesh S Hugar, Bangalore (IN); Babu Singarayan, San Jose, CA (US); Sharmila Koppula, Campbell, CA (US); Soumyodeep Joarder, Bangalore (IN); Sudhin Jacob, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 338 days.

(21) Appl. No.: 16/235,230

(22) Filed: Dec. 28, 2018

(65) Prior Publication Data

US 2020/0213182 A1 Jul. 2, 2020

(51) Int. Cl.
*H04L 12/24* (2006.01)
*H04L 41/0654* (2022.01)
(Continued)

(52) U.S. Cl.
CPC ...... *H04L 41/0654* (2013.01); *H04L 12/4633* (2013.01); *H04L 12/4641* (2013.01); *H04L 45/026* (2013.01); *H04L 69/324* (2013.01)

(58) Field of Classification Search
CPC ............ H04L 41/0654; H04L 12/4633; H04L 12/4641; H04L 45/026; H04L 69/324;
(Continued)

(56) References Cited

U.S. PATENT DOCUMENTS

2007/0171817 A1* 7/2007 Fujita .................... H04L 45/502
370/225
2009/0080438 A1 3/2009 Zhou et al.
(Continued)

OTHER PUBLICATIONS

Extended Search Report from counterpart European Application No. 19180816.1, dated Jan. 31, 2020, 8 pp.
(Continued)

*Primary Examiner* — Edan Orgad
*Assistant Examiner* — Malick A Sohrab
(74) *Attorney, Agent, or Firm* — Shumaker & Sieffert, P.A.

(57) ABSTRACT

Techniques are described to provide layer 2 (L2) circuit failover in the event connectivity to an Ethernet Virtual Private Network (EVPN) instance is lost. For example, if one of multi-homed provider edge (PE) devices loses connectivity to the EVPN instance, the PE device may mark its customer-facing interface as down and propagate the interface status to the access node such that the access node may update its routing information to switch L2 circuits to another one of the multi-homed PE devices having reachability to the EVPN instance. In some examples, the plurality of PE devices may further implement Connectivity Fault Management (CFM) techniques to propagate the interface status to the access node such that the access node may update its forwarding information to send traffic on a different L2 circuit to another one of the multi-homed PE devices having reachability to the EVPN instance.

13 Claims, 6 Drawing Sheets

(51) Int. Cl.
*H04L 12/46* (2006.01)
*H04L 45/02* (2022.01)
*H04L 69/324* (2022.01)

(58) Field of Classification Search
CPC ............ H04L 41/0663; H04L 41/0677; H04L 45/028; H04L 45/04; H04L 45/50; H04L 45/28; H04L 45/12
See application file for complete search history.

(56) References Cited

U.S. PATENT DOCUMENTS

| | | | |
|---|---|---|---|
| 2011/0222413 A1* | 9/2011 | Shukla | H04L 43/0811 370/241.1 |
| 2013/0322453 A1 | 12/2013 | Allan | |
| 2016/0191374 A1* | 6/2016 | Singh | H04L 45/28 370/228 |
| 2017/0288948 A1* | 10/2017 | Singh | H04L 45/50 |
| 2018/0109400 A1 | 4/2018 | Brissette et al. | |
| 2018/0309594 A1 | 10/2018 | Uttaro et al. | |
| 2019/0296966 A1* | 9/2019 | Gao | H04L 45/28 |
| 2019/0356599 A1* | 11/2019 | Brissette | H04L 12/4675 |

OTHER PUBLICATIONS

"Circuit and Translational Cross-Connects Overview" Juniper Networks, Inc., Tech Library, Aug. 30, 2018, 3 pp.
"Configuring Ethernet over MPLS (L2 Circuit)" Juniper Networks, Inc., Tech Library, Oct. 23, 2018, 3 pp.
"Ethernet OAM Connectivity Fault Management" Juniper Networks, Inc., Tech Library, Sep. 24, 2018, 2 pp.
"Hot-standby-vc-on (Protocols Layer 2 Circuit)" Juniper Networks, Inc., Tech Library, Nov. 7, 2016, 2 pp.
"Layer 2 Circuit Overview" Juniper Networks, Inc., Tech Library, Feb. 21, 2018, 2 pp.
"Layer 2 Circuits Overview" Juniper Networks, Inc., Technical Documentation, Tech Library, Mar. 23, 2017, 1 p.
"LDP Message Types" Juniper Networks, Inc., Tech Library, Aug. 31, 2017, 2 pp.
"Network Configuration Example" Layer 2 Circuits, Juniper Networks, Inc., Jan. 19, 2017, 50 pp.
"Pseudowire Subscriber Logical Interfaces Overview" Juniper Networks, Inc., Tech Library, Oct. 9, 2018, 3 pp.
Martini et al. "Pseudowire Setup and Maintenance Using the Label Distribution Protocol (LDP)" Network Working Group, RFC 4447, Apr. 2006, 33 pp.
Andersson et al. "LDP Specification" Network Working Group, RFC 5036, Oct. 2007, 135 pp.
"Understanding Ethernet-over-MPLS (L2 Circuit)" Juniper Networks, Inc., Tech Library, Aug. 27, 2018, 2 pp.
IEEE 9 802.1ag and ITU-T Standardization Sector Recommendation Y.1731, "OAM Functions and Mechanisms for Ethernet Based Networks," ITUT Study Group 13 (2005-2008), May 22, 2006, 80 pp.
IEEE 802.1ag-2007 Standard, "IEEE Standard for Local and Metropolitan Area Networks—Virtual Bridged Local Area Networks—Amendment 5: Connectivity Fault Management," draft standard, LAN MAN Standards Committee, dated Dec. 17, 2007, 259 pp.
Response to Extended Search Report dated Jan. 31, 2020 from counterpart European Application No. 19180816.1, filed Jan. 4, 2021, 16 pp.

\* cited by examiner

CORE ISOLATION FOR LOGICAL TUNNELS STITCHING MULTI-HOMED EVPN AND L2 CIRCUIT

TECHNICAL FIELD

The disclosure relates to computer networks and, more particularly, providing layer two circuit failover within computer networks.

BACKGROUND

A computer network is a collection of interconnected computing devices that can exchange data and share resources. Example network devices include switches or other layer two ("L2") devices that operate within the second layer of the Open Systems Interconnection ("OSI") reference model, i.e., the data link layer, and routers or other layer three ("L3") devices that operate within the third layer of the OSI reference model, i.e., the network layer. Network devices within computer networks often include a control unit that provides control plane functionality for the network device and forwarding components for routing or switching data units.

An Ethernet Virtual Private Network ("EVPN") may be used to extend two or more remote L2 customer networks through an intermediate L3 network (usually referred to as a "provider network" or "core network"), in a transparent manner, i.e., as if the intermediate L3 network does not exist. In particular, the EVPN transports L2 communications, such as Ethernet packets or "frames," between customer networks via traffic engineered label switched paths ("LSP") through the intermediate network in accordance with one or more multiprotocol label switching (MPLS) protocols. In a typical configuration, provider edge ("PE") network devices (e.g., routers and/or switches) coupled to the customer edge ("CE") network devices of the customer networks define label switched paths within the provider network to carry encapsulated L2 communications as if these customer networks were directly attached to the same local area network ("LAN"). In some configurations, the PE devices may also be connected by an IP infrastructure in which case IP/GRE tunneling or other IP tunneling can be used between the network devices.

Devices that operate within the second layer may establish an L2 circuit that provides a point-to-point layer 2 connection over an IP and MPLS-based network. An L2 circuit may allow an IP and MPLS-based network to replace end-to-end Asynchronous Transfer Mode (ATM) networks, Frame Relay networks, and some portions of Time-Division Multiplexing (TDM) networks.

SUMMARY

In general, techniques are described to provide layer 2 (L2) circuit failover in the event connectivity to an Ethernet Virtual Private Network (EVPN) instance is lost. For example, an access node may be multi-homed to a plurality of PE devices that provide access to an EVPN instance. As one example, the access node may be multi-homed to the plurality of PE devices by respective L2 circuits. If one of the multi-homed PE devices loses connectivity to the EVPN instance, the access node may switch from sending and receiving packets to the EVPN instance via an L2 circuit to the PE device that lost connectivity to the EVPN instance, to sending and receiving packets to the EVPN instance via a different L2 circuit connected to another one of the multi-homed PE devices having connectivity to the EVPN instance.

As one example, the plurality of PE devices may each be configured with a core-facing interface for an EVPN instance and a customer-facing interface for a respective L2 circuit between the PE device and the access node. The L2 circuit is "stitched" to the EVPN instance at the PE device. When a PE device determines that connectivity to the EVPN instance is lost, the PE device may initiate "global repair" by marking the customer-facing interface as "down" and propagating the status of the customer-facing interface (referred to herein as "interface status information") to the access node. For example, the PE device may send an L2 circuit protocol packet including the interface status information. In response to receiving the interface status information, the access node may, for example, update its routing information to switch L2 circuits such that the access node may send traffic on a different L2 circuit to another one of the multi-homed PE devices having reachability to the EVPN instance.

In some examples, the access node and the plurality of PE devices may further implement Connectivity Fault Management (CFM) techniques to perform "local repair" at the access node. Connectivity Fault Management includes a number of proactive and diagnostic fault localization procedures such as proactively transmitting connectivity check ("CC") messages at a predetermined rate to other devices (e.g., switches) within a maintenance association. For example, the access node and the plurality of PE devices may be defined as part of a maintenance association that is configured to exchange CFM messages. In response to determining that the connectivity to the EVPN instance is lost, the PE device may include interface status information in a CFM message to inform the access node that the interfaces of the PE device are down. In response to receiving the CFM message including the interface status information, the access node may perform local repair by setting, for example, next hop weights for the plurality of PE devices to cause the access node to send traffic via a different L2 circuit to another one of the multi-homed PE devices (e.g., the PE device with a higher weight) having reachability to the EVPN instance. In some examples, the access node may receive the CFM message including the interface status information before receiving the L2 circuit protocol packet including the interface status information.

The techniques described herein may provide one or more example technical advantages. For example, by performing global repair as described in this disclosure, the access node may obtain information specifying the status of a customer-facing interface for the L2 circuit is down, which information is otherwise unavailable to the access node without the techniques of this disclosure, and update the access node to forward traffic via a different L2 circuit to the other multi-homed PE device to reach the EVPN instance. Moreover, by further implementing local repair as described in this disclosure, an access node may shorten the convergence time to implement repair by setting, in response to receiving the CFM message including the interface status information, next hop weights for the plurality of PE devices to cause the access node to forward traffic received from the CE device via a different L2 circuit (e.g., a higher weighted next hop).

In one example, a method includes determining, by a provider edge (PE) device of a plurality of PE devices configured with an Ethernet Virtual Private Network (EVPN) instance reachable by an Ethernet segment, that connectivity from the PE device to the EVPN instance is lost, wherein the Ethernet segment connects the plurality of PE devices to an access node of an access network that is multi-homed to the plurality of PE devices over the Ethernet segment, wherein the access node is connected by respective layer 2 (L2) circuits to the plurality of PE devices, and wherein the access node is connected to a customer edge (CE) device. The method further includes marking, by the PE device and in response to determining that connectivity from the PE device to the EVPN instance is lost, a customer-facing interface for the L2 circuit of the PE device as having a down status. The method further includes sending, by the PE device and to the access node in response to marking the interfaces, interface status information including information specifying status of the customer-facing interface of the PE device.

In another example, a method includes receiving, by an access node of an access network, interface status information of a first PE device of a plurality of PE devices, wherein the interface status information includes information specifying status of a customer-facing interface for a first layer 2 (L2) circuit that connects the first PE device and the access node, wherein the access node is multi-homed to the plurality of provider edge (PE) devices configured with the EVPN instance reachable by an Ethernet segment connecting the plurality of PE devices to the access node over the Ethernet segment. The method also includes determining, by the access node and in response to receiving the interface status information of the first PE device, that the customer-facing interface for the first L2 circuit as having a down status. The method further includes updating the access node to send traffic on a second L2 circuit that connects a second PE device of the plurality of PE devices.

In yet another example, an access node of an access network that is multi-homed to a plurality of provider edge (PE) devices configured with an Ethernet Virtual Private Network (EVPN) instance reachable by an Ethernet segment connecting the plurality of PE devices to the access node over the Ethernet segment, comprises a memory; and one or more processors coupled to the memory, wherein the one or more processors are configured to: receive interface status information of a first PE device of the plurality of PE devices, wherein the interface status information includes status information on a customer-facing interface for a first layer 2 (L2) circuit that connects the first PE device and the access node; determine that the customer-facing interface for the first L2 circuit as having a down status; and update the access node to send traffic on a second L2 circuit that connects a second PE device of the plurality of PE devices.

The details of one or more aspects of the techniques are set forth in the accompanying drawings and the description below. Other features, objects, and advantages of the techniques of this disclosure will be apparent from the description and drawings, and from the claims.

BRIEF DESCRIPTION OF DRAWINGS

Like reference characters denote like elements throughout the figures and text.

DETAILED DESCRIPTION

Figure 1:
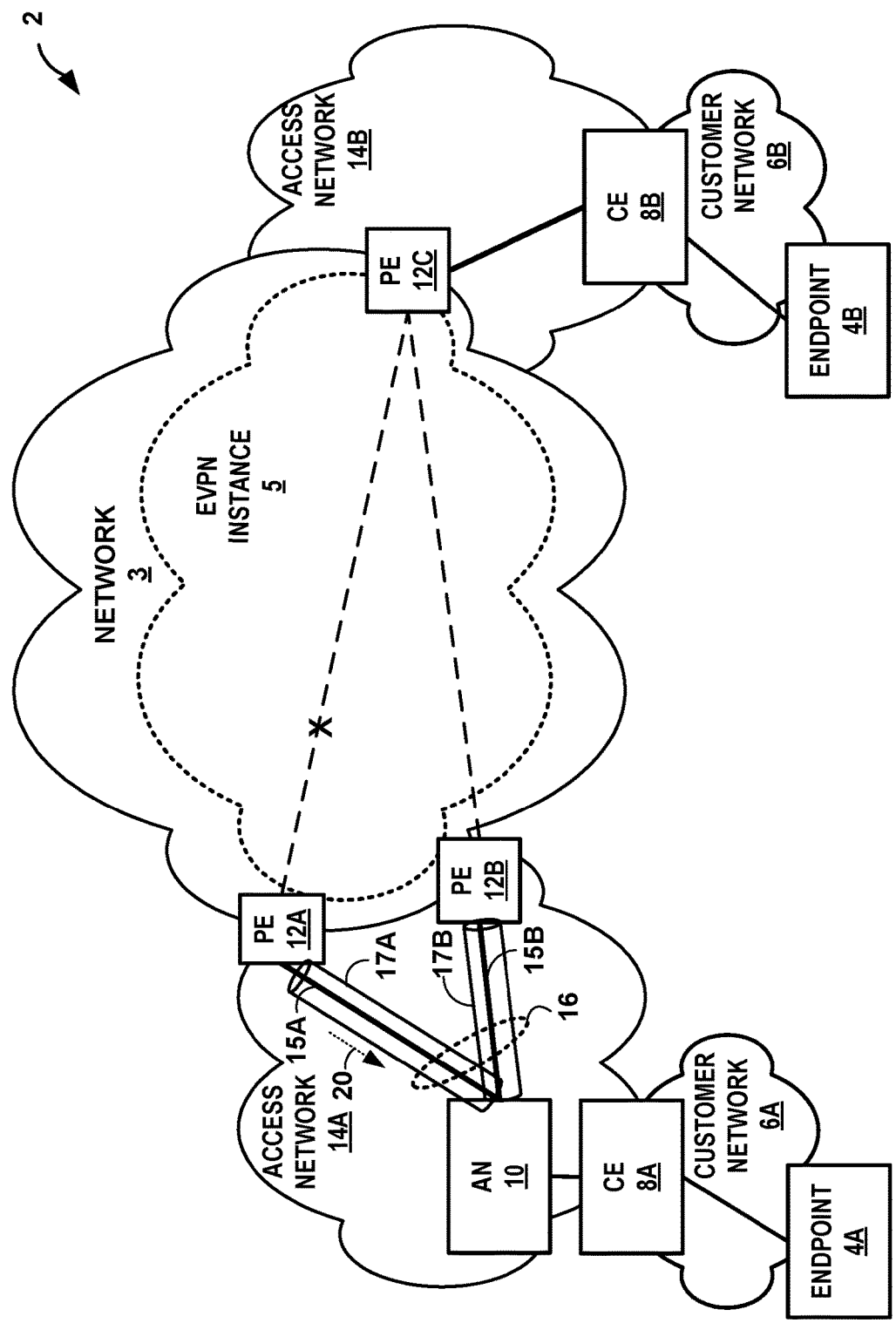
FIG. 1 is a block diagram illustrating an example network system configured to provide layer 2 (L2) circuit failover in the event connectivity to an Ethernet Virtual Private Network (EVPN) instance is lost, in accordance with the techniques described in this disclosure.

FIG. 1 is a block diagram illustrating an example network system 2 configured to provide layer 2 (L2) circuit failover in the event connectivity to an Ethernet Virtual Private Network (EVPN) instance is lost, in accordance with the techniques described in this disclosure. As shown in FIG. 1, network system 2 includes a network 3 and customer networks 6A, 6B ("customer networks 6"). Network 3 may represent a public network that is owned and operated by a service provider to interconnect a plurality of edge networks, such as customer networks 6. Network 3 is an L3 network in the sense that it natively supports L3 operations as described in the OSI model. Common L3 operations include those performed in accordance with L3 protocols, such as the Internet protocol ("IP"). L3 is also known as a "network layer" in the OSI model and the "IP layer" in the TCP/IP model, and the term L3 may be used interchangeably with "network layer" and "IP" throughout this disclosure. As a result, network 3 may be referred to herein as a Service Provider ("SP") network or, alternatively, as a "core network" considering that network 3 acts as a core to interconnect edge networks, such as customer networks 6. The configuration of network system 2 illustrated in FIG. 1 is merely an example. For example, network system 2 may include any number of customer networks 6. Nonetheless, for ease of description, only customer networks 6A, 6B are illustrated in FIG. 1.

Network 3 may provide a number of residential and business services, including residential and business class data services (which are often referred to as "Internet services" in that these data services permit access to the collection of publically accessible networks referred to as the Internet), residential and business class telephone and/or voice services, and residential and business class television services. One such business class data service offered by a service provider intermediate network 3 includes L2 EVPN service. Network 3 represents an L2/L3 switch fabric for one or more customer networks that may implement an L2 EVPN service. An EVPN is a service that provides a form of L2 connectivity across an intermediate L3 network, such as network 3, to interconnect two or more L2 customer networks, such as L2 customer networks 6, that may be located in different geographical areas (in the case of service provider network implementation) and/or in different racks (in the case of a data center implementation). Often, EVPN is transparent to the customer networks in that these customer networks are not aware of the intervening intermediate network and instead act and operate as if these customer networks were directly connected and form a single L2 network. In a way, EVPN enables a form of a transparent local area network ("LAN") connection between two customer sites that each operates an L2 network and, for this reason, EVPN may also be referred to as a "transparent LAN service."

In the example of FIG. 1, provider edge network devices 12A-12C (collectively, "PE devices 12") provide customer endpoints 4A, 4B (collectively, "endpoints 4") associated with customer networks 6 with access to network 3 via customer edge network devices 8A, 8B (collectively, "CE devices 8"). CE device 8A may connect to PE devices 12A, 12B via access node (AN) 10 of access network 14A to reach network 3. In some examples, access networks 14A, 14B (collectively, "access networks 14") may represent any L2 network, such as a physical or virtual LAN. Each of access networks 14 may include a network of transport routers, e.g., AN 10, that transport L2 communications for customer networks 6 though respective access networks 14 for that customer. Access node 10 may, for example, represent an aggregation network device that provides CE devices with access to PE devices.

PE devices 12 and CE devices 8 may each represent a router, switch, or other suitable network device that participates in a L2 virtual private network ("L2VPN") service, such as an EVPN. Each of endpoints 4 may represent one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

Although additional network devices are not shown for ease of explanation, it should be understood that network system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of network system 2 are illustrated as being directly coupled, one or more additional network elements may be included, such that the network devices of network system 2 are not directly coupled.

To configure an EVPN, a network operator/administrator of network 3 configures, via configuration or management interfaces, various devices included within network 3 that interface with L2 customer networks 6. The EVPN configuration may include an EVPN instance ("EVI") 5, which consists of one or more broadcast domains. EVPN instance 5 is configured within intermediate network 3 for customer networks 6 to enable endpoints 4 within customer networks 6 to communicate with one another via the EVI as if endpoints 4 were directly connected via a L2 network. Generally, EVI 5 may be associated with a virtual routing and forwarding instance ("VRF") (not shown) on a PE device, such as any of PE devices 12A-12C. Consequently, multiple EVIs may be configured on PE devices 12 for Ethernet segment 16, each providing a separate, logical L2 forwarding domain. In this way, multiple EVIs may be configured that each includes one or more of PE devices 12A-12C. As used herein, an EVI is an EVPN routing and forwarding instance spanning PE devices 12A-12C participating in the EVI. Each of PE devices 12 is configured with EVI 5 and exchanges EVPN routes to implement EVI 5. In the example of FIG. 1, PE devices 12A-12C may each be configured with a core-facing interface to exchange EVPN routes to implement EVI 5.

In EVPN, a CE device is said to be multi-homed when it is coupled to two physically different PE devices on the same EVI when the PE devices are resident on the same physical Ethernet segment. For example, CE device 8A is coupled to access nodeaccess node 10, which is coupled to PE devices 12A and 12B via links 15A and 15B, respectively, where PE devices 12A and 12B are capable of providing L2 customer network 6A access to the EVPN via CE device 8A. In instances where a given customer network (such as customer network 6A) may couple to network 3 via two different and, to a certain extent, redundant links, the customer network may be referred to as being "multi-homed." Multi-homed networks are often employed by network operators so as to improve access to the EVPN provided by network 3 should a failure in one of links 15A and 15B occur. When a CE device is multi-homed to two or more PE devices, either one or all of the multi-homed PE devices are used to reach the customer site depending on the multi-homing mode of operation.

In the example of FIG. 1, for use in transporting communications associated with one or more EVIs, the network operator configures L2 circuits 17A-17B (collectively, "L2 circuits 17") to send traffic between AN 10 and PE devices 12A and 12B, respectively. L2 circuits 17 (otherwise referred to as "pseudowires") are logical network connections formed from two unidirectional label switched paths (LSPs) that emulate a connection not natively offered by network 3 for consumption outside the boundaries of network 3. L2 circuits 17 may emulate an L2 connection within network 3 enabling network 3 to offer emulated L2 connectivity externally for consumption by L2 customer networks 6. As such, each EVPN instance may operate over L2 circuits 17 to enable a logical tunnel providing L2 connectivity between customer network 6. An L2 circuit terminates in a logical tunnel at a logical tunnel interface of a PE device (e.g., PE device 12A), which may be configured to have a peer relationship with a second logical tunnel interface of the PE device for the EVPN instance, thereby "stitching" the L2 circuit with the EVPN instance to create a point-to-point connection. In this way, access node 10 may tunnel Ethernet packets into the L2 circuit to reach the EVPN instance.

To establish an L2 circuit, L2 circuit peers, e.g., PE device 12A and AN 10, use the same Interior Gateway Protocol (IGP), such as Intermediate System-to-Intermediate System (IS-IS) or Open Shortest Path First (OSFP) and may configure a virtual circuit connecting the L2 circuit peers, which represents a point-to-point layer 2 connection transported over Multiprotocol Label Switching (MPLS) (e.g., Label Distribution Protocol (LDP) or Resource Reservation Protocol with Traffic Engineering (RSVP-TE)) or other tunneling technology. In the example of FIG. 1, AN 10 may configure an interface for the L2 circuit 17A to send/receive traffic (e.g., an Ethernet packet) encapsulated with an MPLS header associated with L2 circuit 17A, and PE device 12A may configure a customer-facing interface for the L2 circuit 17A (otherwise referred to as, "pseudowire subscriber (PS) transport logical interface") to send/receive traffic encapsulated with the MPLS header associated with L2 circuit 17A. Similarly, AN 10 may configure an interface for L2 circuit 17B to send/receive traffic encapsulated with an MPLS header associated with L2 circuit 17B, and PE device 12B may configure a customer-facing interface for the L2 circuit 17B to send/receive traffic encapsulated with the MPLS header associated with L2 circuit 17B. In this way, CE device 8A is multi-homed to PE devices 12A and 12B via AN 10 by respective circuits 17.

In some examples, AN 10 may configure corresponding L2 circuits 17 as "active" or "standby" (otherwise referred to herein as "hot-standby") such that AN 10 may send traffic to the active L2 circuit, unless the active L2 circuit fails. In the example of FIG. 1, AN 10 may initially designate L2 circuit 17A as active and L2 circuit 17B as standby such that AN 10 sends traffic on L2 circuit 17A to PE device 12A, unless L2 circuit 17A fails.

In some examples, connectivity to the EVPN instance through one of the multi-homed PE devices may be lost (e.g., fiber cut, core-facing interface goes down, etc.). For example, BGP connectivity to the EVPN core is lost, e.g., a BGP session goes down. This loss of connectivity to the EVPN instance is referred to as "core isolation." Without the techniques described herein, an access node is unaware that the PE device no longer has connectivity to EVPN instance, and may continue to send traffic on the active L2 circuit to the original PE device. However, because the original PE device no longer has connectivity to EVPN instance, the other multi-homed PE device becomes the active device and the original PE device drops the traffic received from the access node, therefore resulting in traffic loss.

In accordance with the techniques described herein, an access node may provide L2 circuit failover in the event connectivity to an EVPN instance is lost. For example, PE device 12A may determine that it no longer has connectivity to EVPN instance 5 and initiates "global repair." To determine loss in connectivity to EVPN instance 5, PE device 12A may send connectivity detection packets to other PE devices in network 3.

For example, connectivity detection packets may include keep alive packets configured in accordance with Bidirectional Forwarding Detection (BFD), or other similar connectivity detection protocols. Alternatively, or additionally, PE device 12A may use BGP to determine loss in connectivity to EVPN instance 5. For example, PE devices 12 may establish a BGP session with each other and may send BGP messages (e.g., keep-alive packets) to detect whether a connection to a BGP peer of a BGP session is lost.

In response to determining that PE device 12A has lost connectivity to the EVPN instance 5, e.g., by not receiving a response to a keep-alive packet, PE device 12A may mark its customer-facing interface for L2 circuit 17A as having a "down" status. In this way, with the down status the logical interface of PE device 12A for the EVPN instance may no longer send or receive packets from EVPN instance 5 and the logical interface for the L2 circuit may no longer send or receive packets from the L2 circuit.

PE device 12A may propagate the status of the customer-facing interface (referred to herein as "interface status information") to AN 10. As one example, PE device 12A may send an L2 circuit protocol message 20 (e.g., a protocol data unit (PDU) in accordance with an L2 circuit protocol (e.g., LDP, RSVP-TE, etc.)) including the interface status information in a Type, Length, Value (TLV) of the message 20. In some examples, the TLV of message 20 may be a pseudowire status TLV used to communicate the status of a pseudowire, e.g., L2 circuit 17A. For instance, PE device 12A may send a pseudowire status TLV that includes a status flag to indicate the interface status has changed. In an example implementation in which L2 circuit 17A is implemented with MPLS, PE device 12A may send a pseudowire status TLV having a status flag of "admin down" to indicate that the customer-facing interface for the MPLS L2 circuit (e.g., a circuit cross connect (CCC) interface), is marked as having a "down" status. In other examples in which the L2 circuit is implemented by other tunneling technologies (e.g., BGP or LDP), PE device 12A may include status flags corresponding to the tunneling technologies to indicate the interface status of the customer-facing interface. Additional examples of the pseudowire status TLV is described in L. Martini et al., "Pseudowire Setup and Maintenance Using the Label Distribution Protocol (LDP)," Request for Comments 8077, February 2017, the entire contents of which is incorporated by reference herein.

In response to receiving message 20 including the interface status information, AN 10 may update its routing information by setting L2 circuit 17B as the "active" virtual circuit. That is, AN 10 may switch the active L2 circuit from L2 circuit 17A to L2 circuit 17B such that when AN 10 receives traffic from CE device 8A, AN 10 may send traffic to PE device 12B via L2 circuit 17B.

In this way, by performing global repair as described above, an access node may obtain information indicating that the interface status of a L2 circuit peer is down, which the access node is otherwise unaware of without the techniques of this disclosure, and in response, update the access node to send traffic on a different L2 circuit to another multi-homed PE device having reachability for the EVPN instance.

Figure 2:
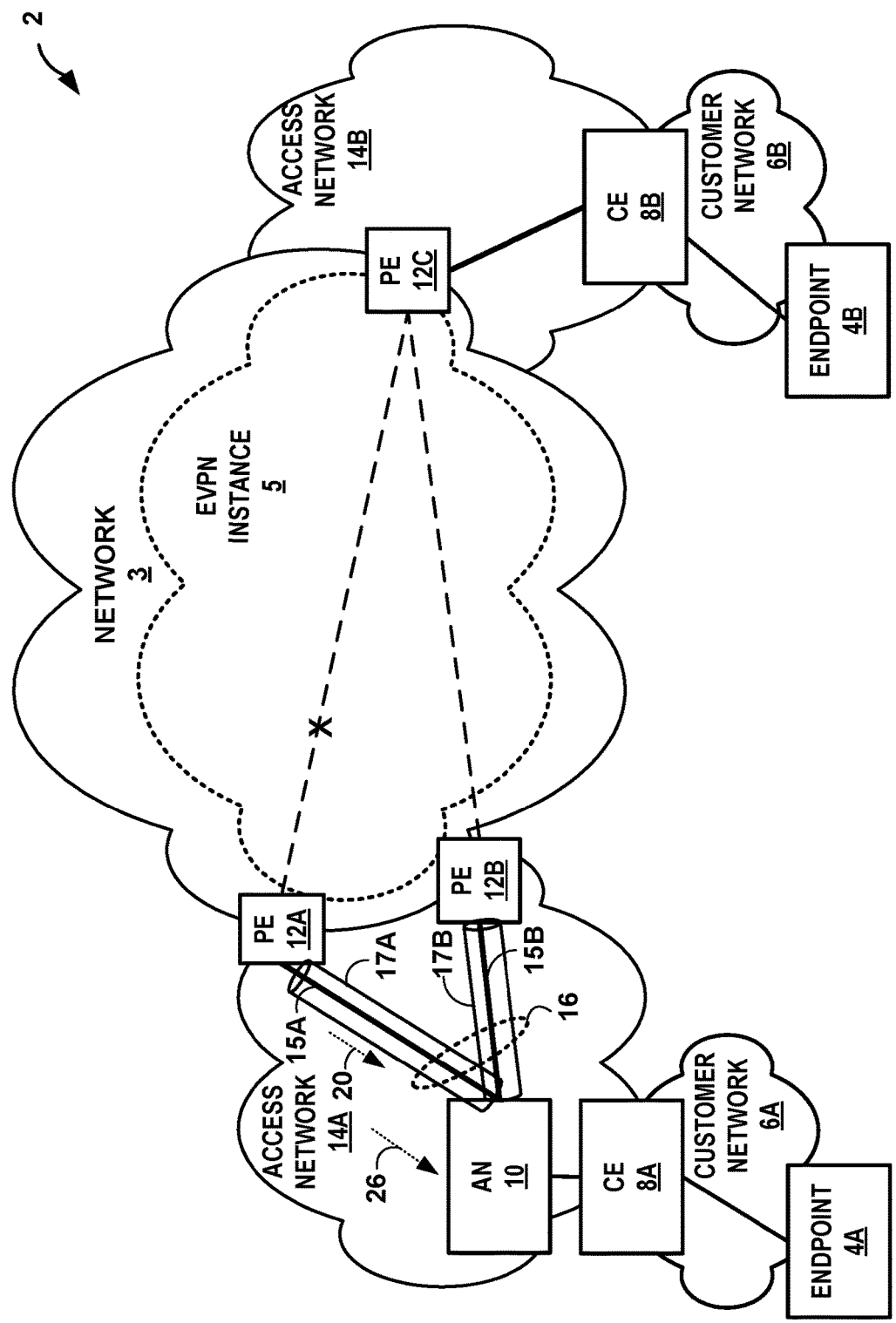
FIG. 2 is a block diagram illustrating another example network system configured to provide L2 circuit failover in the event connectivity to an EVPN instance is lost, in accordance with the techniques described in this disclosure.

FIG. 2 is a block diagram illustrating another example network system configured to provide L2 circuit failover in the event connectivity to an EVPN instance is lost, in accordance with the techniques described in this disclosure. Network system 2 of FIG. 2 is similar to network system 2 of FIG. 1, except for the additional features described below.

The time it takes to perform global repair, as described above with respect to FIG. 1, may depend on the load of a routing engine (e.g., a routing process) of PE device 12A. For example, PE device 12A may exchange other control plane messages in addition to the L2 circuit protocol packet, which may result in a higher load for the routing engine of PE device 12A. Due to a higher load of the routing engine, PE device 12A may not send the L2 circuit protocol packet including the interface status information, e.g., message 20, until after some time (e.g., after a few seconds).

In the example of FIG. 2, access node 10 may reduce convergence time by additionally performing "local repair" concurrently with the global repair process. For example, access node 10 may perform local repair by receiving Operations, Administration, and Management (OAM) packets including interface status information and perform local repair to a different one of L2 circuits 17. As one example, PE devices 12A, 12B and access node 10 may implement OAM techniques, such as Connectivity Fault Management (CFM) as described in the Institute of Electrical and Electronics Engineers (IEEE) 802.1ag standard and International Telecommunications Union Telecommunications Standardization Sector Y.1731, entitled "OAM functions and mechanisms for Ethernet based networks," dated May 2006, the entire contents of both of which are incorporated by reference herein. CFM may generally enable discovery and verification of a path, through network devices and networks, taken by data units, e.g., frames or packets, addressed to and from specified network users, e.g., customer networks 6. Typically, CFM may collect status information of network devices within layer 2 networks.

CFM generally provides a set of protocols by which to provide status updates of network devices and/or perform fault management. One protocol of the CFM set of protocols may involve a periodic transmission of CFM messages to determine, verify or otherwise check continuity between two endpoints and may be referred to as a "Continuity Check Protocol." More information regarding CFM in general and the CFM set of protocols, including the continuity check protocol, can be found in an Institute of Electrical and Electronics Engineers (IEEE) draft standard, titled "Virtual Bridged Local Area Networks—Amendment 5: Connectivity Fault Management," by the LAN MAN Standards Committee, dated Dec. 17, 2007, herein incorporated by reference in its entirety.

In accordance with CFM, one or more users or administrators of network system 2 may establish various abstractions useful for managing maintenance operations. For example, an administrator may establish a Maintenance Domain ("MD") specifying those of network devices that support CFM maintenance operations. In other words, the MD specifies the network or part of the network for which status in connectivity may be managed. The administrator may, in establishing or defining the MD, assign a maintenance domain name to the MD, which represents a MD identifier that uniquely identifies a particular MD. For purposes of illustration, the MD includes PE devices 12A, 12B and AN 10.

The administrator may further sub-divide the MD into one or more Maintenance Associations ("MA"). MA is a logical grouping that generally comprises a set of network devices included within the MD and established to verify the integrity and/or status of a single service instance. A service instance may, for example, represent a portion, e.g., network devices, of a provider network that a given customer can access to query a status of services delivered for that customer. In the example of FIG. 2, the administrator may configure an MA to include AN 10 and PE devices 12A, 12B. To establish the MA, the administrator may configure a Maintenance Association End Point (MEP) within each one of the network devices monitored, e.g., AN 10 and PE devices 12A, 12B. MEPs may each represent an actively managed CFM entity that generates and receives CFM Protocol Data Units ("PDUs") and tracks any responses. In other words, each of MEPs represents an endpoint of the same MA.

Once configured with the above associations, PE devices 12A, 12B and AN 10 may establish one or more CFM sessions to monitor interface status. For example, PE devices 12A, 12B may establish CFM sessions that operate in distributed mode with AN 10 over links 15A, 15B of Ethernet segment 16 to communicate interface status information of the customer-facing interface of PE devices 12A, 12B. With the CFM sessions, PE devices 12A, 12B may communicate CFM messages, e.g., CFM message 26, to AN 10 including interface status information. For example, an administrator may configure an event for a CFM action profile to define event flags and thresholds, such as whether CFM messages includes the interface status information, to be monitored. CFM message 26 includes various type, length, and value (TLV) elements to provide the status of the customer-facing interface of PE devices (referred to herein as "interface status TLV"). TLV elements may be configured to provide optional information in CFM PDUs. For example, CFM message 26 may include an interface status TLV that specifies the status of the interfaces of PE devices 12A or 12B. An interface status TLV, for example, may be structured according to the following format of Table 1:

TABLE 1

Interface Status TLV

Type = 4 (1 octet)
Length (2-3 octets)
Interface Status Value (4 octets)

In one example, the interface status value may represent a status value of the customer-facing interface of a PE device. For example, the interface status TLV may include interface statuses of "up" or "down" to represent the state of customer-facing interfaces for which PE devices 12 are currently configured.

In response to determining that connectivity to the EVPN instance is lost and the customer-facing interface for L2 circuit 17A is marked down, PE device 12A may, in addition to performing global repair (e.g., by sending an L2 circuit protocol packet including the interface status information (e.g., message 20)), send OAM packets including interface status information to AN 10. For example, PE device 12A may include the interface status information in the interface status TLV of CFM message 26 with an interface status value of "down" to indicate the current status of customer-facing interface of PE device 12A. In other words, MEPs of PE devices 12A, 12B may each be configured with one or more other MEPs (e.g., AN 10) with which the MEP expects to exchange (or transmit and receive) CFM messages announcing, in response to an interface status change, the current status of the customer-facing interface of the transmitting one of MEPs.

MEPs may execute the continuity check protocol to automatically, e.g., without any administrator or other user oversight after the initial configuration, exchange these CFM messages according to a configured or, in some instances, set period (e.g., milliseconds). MEPs may, in other words, implement the continuity check protocol to collect the status of interfaces in a shorter amount of time.

In response to AN 10 receiving CFM message 26, AN 10 may perform local repair. For example, AN 10 may update its forwarding information (e.g., a unilist next hop) to forward traffic on the other L2 circuit, e.g., L2 circuit 17B. For instance, AN 10 may configure forwarding information to include weighted next hops to PE devices 12A, 12B. In one case, AN 10 may set a higher next hop weight for PE device 12B than for PE device 12A such that AN 10 may send traffic to PE device 12B via L2 circuit 17B. Although described with respect to sending traffic to the PE device set to a higher weight, AN 10 may set different weights for PE devices 12A and 12B to cause AN 10 to send traffic to the PE device set to a higher or lower weight. For example, AN 10 may set a lower next hop weight for PE device 12B than for PE device 12A such that AN 10 may, based on configured preferences, select the lower-weighted next hop and send traffic to PE device 12B via L2 circuit 17B.

In this way, by propagating interface status information to AN 10 using CFM messages, AN 10 may receive interface status information of a PE device within a reduced period of time (e.g., milliseconds), thereby providing faster convergence time in performing failover.

Figure 3:
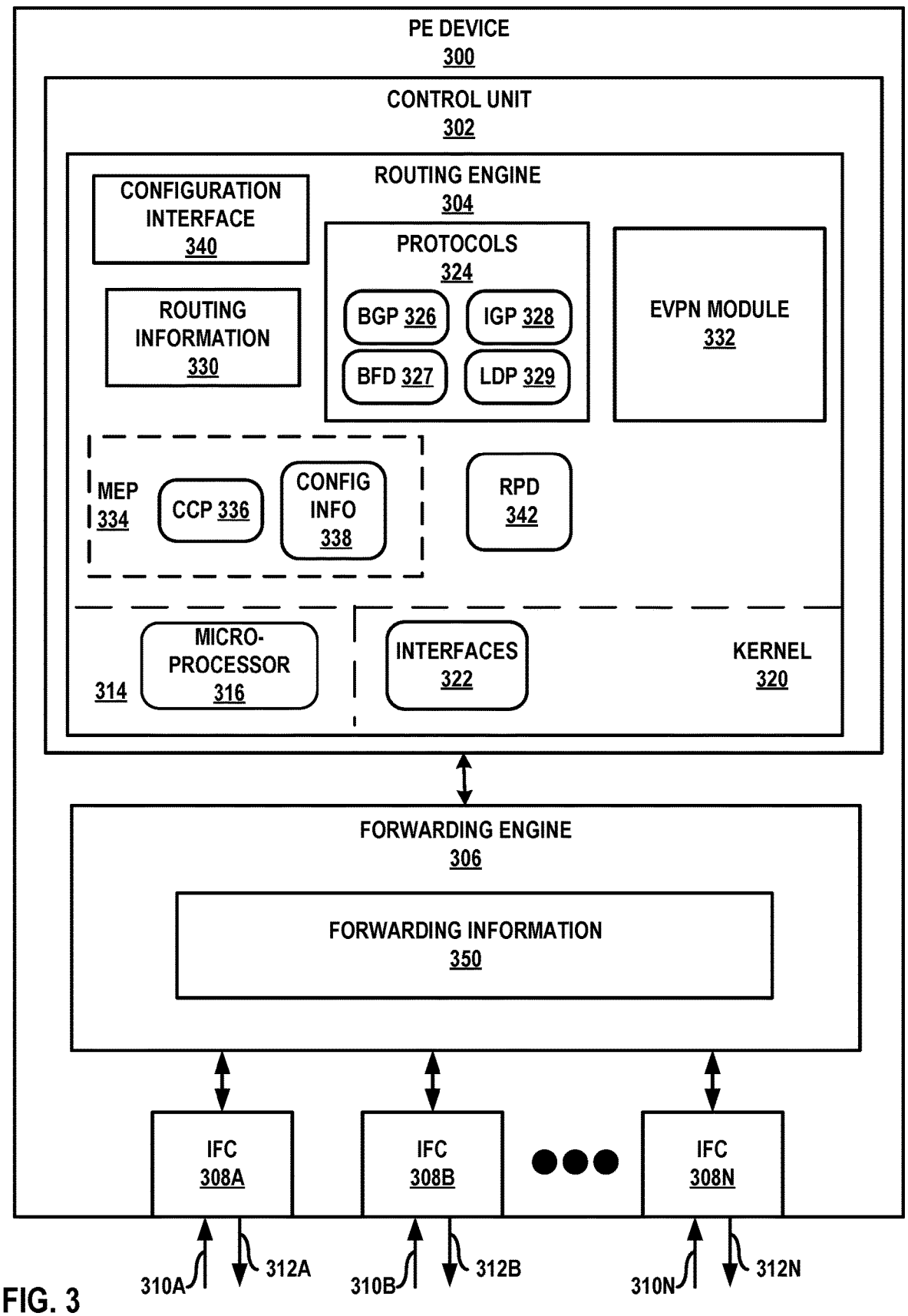
FIG. 3 is a block diagram illustrating an example provider edge device configured to provide L2 circuit failover in the event connectivity to an EVPN instance is lost, in accordance with the techniques described in this disclosure.

FIG. 3 is a block diagram illustrating an example of a provider edge device configured to provide L2 circuit failover in the event connectivity to an EVPN instance is lost, in accordance to the techniques described herein. PE device 300 is described with respect to PE device 12A of FIGS. 1 and 2, but may be performed by any multi-homed network device connected by an Ethernet segment to an access node, e.g., AN 10 of FIGS. 1 and 2.

As shown in FIG. 3, PE device 300 includes a control unit 302 having a routing engine 304 (control plane), and control unit 302 is coupled to forwarding engine 306 (data plane). Forwarding engine 306 is associated with one or more interface cards 308A-308N ("IFCs 308") that receive packets via inbound links 310A-310N ("inbound links 310") and send packets via outbound links 312A-312N ("outbound links 312"). IFCs 308 are typically coupled to links 310, 312 via a number of interface ports (not shown). Inbound links 310 and outbound links 312 may represent physical interfaces, logical interfaces, or some combination thereof. In the example of FIG. 3, any of links 310, 312 of PE device 300 may be associated with a customer-facing interface for an L2 circuit or a core-facing interface for an EVPN instance. In some examples, the customer-facing interface may comprise a circuit cross connect (CCC) interface including at least one of a Frame relay data-link connection identifier (DLCI), an Asynchronous Transfer Mode (ATM) Virtual Circuit (VC), a Point-to-Point (PPP) interface, a High-Level Data Link Control (HDLC) interface, and a Multiprotocol Label Switching Label Switched Path (MPLS LSP). The core-facing interface may comprise an Integrated Routing and Bridging (IRB) interface.

Elements of control unit 302 and forwarding engine 306 may be implemented solely in software, or hardware, or may be implemented as combinations of software, hardware, or firmware. For example, control unit 302 may include one or more processors 316 that may represent, one or more microprocessors, digital signal processors ("DSPs"), application specific integrated circuits ("ASICs"), field programmable gate arrays ("FPGAs"), or any other equivalent integrated or discrete logic circuitry, or any combination thereof, which execute software instructions. In that case, the various software modules of control unit 302 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory ("RAM"), read only memory ("ROM"), programmable read only memory (PROM), erasable programmable read only memory ("EPROM"), electronically erasable programmable read only memory ("EEPROM"), non-volatile random access memory ("NVRAM"), flash memory, a hard disk, a CD-ROM, a floppy disk, a cassette, a solid state drive, magnetic media, optical media, or other computer-readable media. Computer-readable media may be encoded with instructions corresponding to various aspects of PE device 300, e.g., protocols, processes, and modules. Control unit 302, in some examples, retrieves and executes the instructions from memory for these aspects.

Routing engine 304 operates as a control plane for PE device 300 and includes an operating system that provides a multi-tasking operating environment for execution of a number of concurrent processes. Routing engine 304 includes a kernel 320, which provides a run-time operating environment for user-level processes. Kernel 320 may represent, for example, a UNIX operating system derivative such as Linux or Berkeley Software Distribution ("BSD"). Kernel 320 offers libraries and drivers by which user-level processes may interact with the underlying system. Hardware environment 314 of routing engine 304 includes processor 316 that executes program instructions loaded into a main memory (not shown in FIG. 3) from a storage device (also not shown in FIG. 3) in order to execute the software stack, including both kernel 320 and processes executing on the operating environment provided by kernel 320.

Kernel 320 includes an interfaces table 322 that represents a data structure that includes a corresponding entry for each interface configured for PE device 300. In the example of FIG. 3, interfaces table 322 may include an entry for a customer-facing interface status for L2 circuit 17A.

Kernel 320 provides an operating environment that executes various protocols 324 at different layers of a network stack, including protocols for implementing EVPN networks. For example, routing engine 304 includes network protocols that operate at a network layer of the network stack. Protocols 324 provide control plane functions for storing network topology in the form of routing tables or other structures, executing routing protocols to communicate with peer routing devices and maintain and update the routing tables, and provide management interface(s) to allow user access and configuration of PE device 300. That is, routing engine 304 is responsible for the maintenance of routing information 330 to reflect the current topology of a network and other network entities to which PE device 300 is connected. In particular, routing protocols 324 periodically update routing information 330 to reflect the current topology of the network and other entities based on routing protocol messages received by PE device 300.

In the example of FIG. 3, routing protocols 324 include the Border Gateway Protocol ("BGP") 326 for exchanging routing information with other routing devices and for updating routing information 330. In EVPN, PE device 300 may use BGP 326 to advertise to other network devices the MAC addresses PE device 300 has obtained from local customer edge network devices to which PE device 300 is connected via an access node. In particular, PE device 300 may use a BGP route advertisement message to announce reachability information for the EVPN, where the BGP route advertisement specifies one or more MAC addresses obtained by PE device 300 instead of L3 routing information. PE device 300 updates routing information 330 based on the BGP route advertisement message.

Routing protocols 324 may also include interior gateway protocol (IGP) 328 (e.g., Intermediate System to Intermediate System (IS-IS) or Open Shortest Path First (OSPF)) and LDP 329 to establish an L2 circuit, e.g., L2 circuit 17A of FIG. 1, with a peer network device. For example, PE device 300 and an L2 circuit peer (e.g., AN 10 of FIG. 1) may use the same IGP 328 such as IS-IS or OSPF. PE device 300 may establish with the L2 circuit peer a point-to-point layer 2 connection transported over MPLS, such as LDP 329. In this way, PE device 300 may send and receive traffic on an L2 circuit associated with one of IFCs 308. Although illustrated with LDP, routing protocols 324 may also include RSVP-TE or other routing protocols to establish a point-to-point layer 2 connection.

PE device 300 may also use BGP to send messages (e.g., keep alive) to determine whether connectivity to the EVPN instance is lost. In some example, routing engine 304 may include BFD 328 to exchange keep alive messages within the core network to determine connectivity of network devices to the EVPN instance.

Routing information 330 may include information defining a topology of a network, including one or more routing tables and/or link-state databases. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF). In contrast, forwarding information 330 is generated based on selection of certain routes within the network and maps packet key information (e.g., L2/L3 source and destination addresses and other select information from a packet header) to one or more specific next hops forwarding structures within forwarding information 330 and ultimately to one or more specific output interface ports of IFCs 308. Routing engine 330 may generate forwarding information 350 in the form of a radix tree having leaf nodes that represent destinations within the network.

Routing engine 304 also includes an EVPN module 332 that performs L2 learning using BGP 326. EVPN module 332 may maintain MAC tables for each EVI established by PE device 300, or in alternative examples may maintain one or more MAC tables that are independent of each respective EVI. The MAC tables, for instance, may represent a virtual routing and forwarding table of VRFs for an EVI configured for the VRF. EVPN module 332 may perform local L2/L3 (e.g., MAC/IP) binding learning by, e.g., using MAC information received by PE device 300.

Forwarding engine 306 represents hardware and logic functions that provide high-speed forwarding of network traffic. Forwarding engine 306 typically includes a set of one or more forwarding chips programmed with forwarding information that maps network destinations with specific next hops and the corresponding output interface ports. In general, when PE device 300 receives a packet via one of inbound links 310, forwarding engine 306 identifies an associated next hop for the data packet by traversing the programmed forwarding information based on information within the packet. Forwarding engine 306 forwards the packet on one of outbound links 312 mapped to the corresponding next hop.

In the example of FIG. 3, forwarding engine 306 includes forwarding information 350. In accordance with routing information 330, forwarding engine 350 stores forwarding information 350 that maps packet field values to network destinations with specific next hops and corresponding outbound interface ports. For example, routing engine 304 analyzes routing information 330 and generates forwarding information 350 in accordance with routing information 330. Forwarding information 350 may be maintained in the form of one or more tables, link lists, radix trees, databases, flat files, or any other data structures.

Forwarding engine 306 stores forwarding information 350 for each Ethernet VPN Instance (EVI) established by PE device 300 to associate network destinations with specific next hops and the corresponding interface ports. For example, in response to receiving traffic from the EVPN instance from a core-facing interface (e.g., one of IFCs 308), forwarding engine 306 may determine from forwarding information 350 to forward the incoming traffic to a customer-facing interface for an L2 circuit (e.g., another one of IFC 308) connected between PE device 300 and an L2 circuit peer (e.g., AN 10 of FIG. 1). Alternatively, or additionally, in response to receiving traffic from the customer-facing interface for the L2 circuit, forwarding engine 306 may determine from forwarding information 350 to forward the incoming traffic to the core-facing interface for the EVPN instance.

In accordance with the techniques described herein, PE device 300 may provide L2 circuit failover in the event connectivity to an Ethernet Virtual Private Network (EVPN) instance is lost. In the example of FIG. 3, routing engine 304 may include a routing protocol daemon (RPD) 342 that may execute BGP 326 or BFD 328 to determine connectivity to the EVPN instance. For example, routing engine 304 may execute BGP 326 or BFD 328 to send keep alive messages to other PE devices to determine whether connectivity to the EVPN instance is lost. In response to determining that connectivity to the EVPN instance is lost (e.g., by failing to receive a response to the keep alive packet), RPD 342 may inform kernel 320 to change the customer-facing interface status entry from an "up" state to a "down" state in interfaces table 322 for a corresponding IFC 308 associated with L2 circuit 17A. RPD 342 may execute an L2 circuit protocol, e.g., LDP 329, to communicate with a remote RPD of a peer L2 circuit (e.g., AN 10 of FIG. 1) to propagate customer-facing interface of network device 300, e.g., via message 20 of FIG. 1. For example, RPD 342 may include the interface status information in a TLV of an LDP packet.

In some examples, routing engine 304 may also include a maintenance endpoint ("MEP") 334 that may represent a hardware or a combination of hardware and software of control unit 302 that implements one or more of the CFM suite of protocols, such as Continuity Check Protocol ("CCP") 336. Network device 300 may use CCP 336 to periodically transmit Connectivity Fault Messages (CFM), such as Continuity Check Messages ("CCM"), to actively propagate a customer-facing interface status indicating a change in interface status to another MEP. For example, PE device 300 may actively manage CFM Protocol Data Units in CCM messages (e.g., message 26 of FIG. 2), including the interface status TLVs indicating the current status of IFCs 308 of PE device 300. In response to determining that a customer-facing interface status entry in the interfaces table 322 is marked down as a result of a loss in connectivity to the EVPN instance, routing engine 304 uses CCP 336 to configure CFM messages (e.g., CFM messages 26 of FIG. 1) including an interface status value of the state of IFCs 308 (as "up" or "down") associated with L2 circuit 17A. PE device 300 may use CCP 336 to propagate these CFM messages to the L2 circuit peer (e.g., AN 10 of FIG. 1) configured as a maintenance endpoint in the same maintenance association as PE device 300. MEPs 334 may represent the MEPs as described above with respect to FIG. 1. MEP 334 may include other protocols not shown in FIG. 3, such as Loopback Protocol (LBP) and/or other protocols to implement Connectivity Fault Management techniques.

Routing engine 304 includes a configuration interface 340 that receives and may report configuration data for PE device 300. Configuration interface 340 may represent a command line interface; a graphical user interface; Simple Network Management Protocol ("SNMP"), Netconf, or another configuration protocol; or some combination of the above in some examples. Configuration interface 340 receives configuration data configuring the PE device 300, and other constructs that at least partially define the operations for PE device 300, including the techniques described herein. For example, an administrator may, after powering-up, activating or otherwise enabling PE device 300 to operate within a network, interact with control unit 302 via configuration interface 340 to configure MEP 334. The administrator may interact with configuration interface 340 to input configuration information 338 ("config info 338") that includes the various parameters and information described above to establish, initiate, or otherwise enable MEP 334 to configure and propagate customer-facing interface of PE device 300 to an access in response to a change in interface status resulting from a failure in connectivity to the EVPN instance. As one example, an administrator may interact with configuration interface 340 to input configuration information 338 to include the customer-facing interface status information in a TLV of a CFM message.

Once configured, PE device 300 may transmit CFM messages to another network device within the same maintenance association as network device 300 (e.g., to AN 10 of FIG. 1). Routing engine may use MEP 334 to configure CFM messages indicating the current interface status of network device 300 based on a change in interface status resulting from a loss in connectivity to the EVPN instance. For example, MEP 334 may include the interface status information in the TLV of the CFM PDUs. Network device 300 may forward the CFM message including the interface status information to the other network device within the same maintenance association through output interface ports of IFCs 308.

Figure 4:
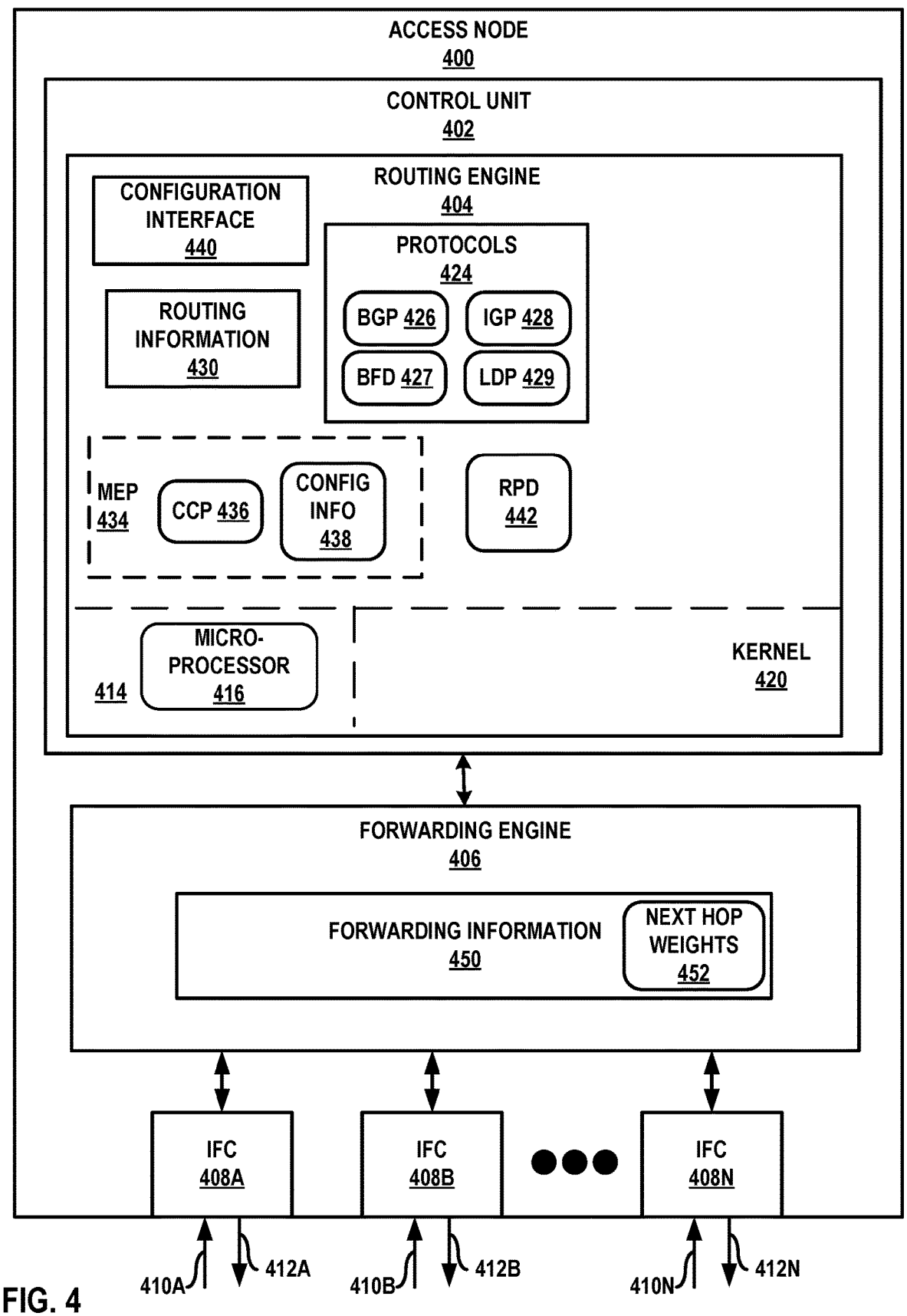
FIG. 4 is a block diagram illustrating an example of an access node configured to provide L2 circuit failover in the event connectivity to an EVPN instance is lost, in accordance with the techniques described herein.

FIG. 4 is a block diagram illustrating an example of an access node configured to provide L2 circuit failover in the event connectivity to an EVPN instance is lost, in accordance to the techniques described herein. Access node 400 ("AN 400") is described with respect to PE device 12A of FIGS. 1 and 2, but may be performed by any multi-homed network device connected by an Ethernet segment to an access node, e.g., AN 10 of FIGS. 1 and 2. AN 400 includes similar modules, units or components as PE device 300 of FIG. 3, and may include additional modules, units or components, as described below.

In the example of FIG. 4, any of links 410, 412 may be associated with an interface for an L2 circuit of FIG. 1. Access node 400 may include routing protocols 424 that includes IGP 428 (e.g., Intermediate System to Intermediate System (IS-IS) or Open Shortest Path First (OSPF)) and LDP 429 to establish L2 circuits, e.g., L2 circuits 17A and 17B of FIG. 1, with respective peer network devices, e.g., PE devices 12A and 12B of FIG. 1, reachable by corresponding IFCs 408. For example, access node 400 and a first L2 circuit peer (e.g., PE device 12A of FIG. 1) may use the same IGP 428 such as IS-IS or OSPF. Access node 400 may establish with the first L2 circuit peer a first point-to-point layer 2 connection transported over MPLS, such as LDP 429. In this way, access node 400 may send and receive traffic on a first L2 circuit associated with one of IFCs 408, e.g., IFC 408A. Similarly, access node 400 and a second L2 circuit peer (e.g., PE device 12B of FIG. 1) may use the same IGP 428 such as IS-IS or OSPF. Access node 400 may establish with the second L2 circuit peer a second point-to-point layer 2 connection transported over MPLS, such as LDP 429. In this way, access node 400 may send and receive traffic on a second L2 circuit associated with another one of IFCs 408, e.g., IFC 408B. Although illustrated with LDP, routing protocols 424 may also include RSVP-TE or other routing protocols to establish a point-to-point layer 2 connection.

In the example of FIG. 4, access node 400 may use RPD 442 to send and receive traffic (e.g., message 20 of FIG. 1) from L2 circuit peers. RPD 442 may execute LPD 429 to receive LDP packets from L2 circuit peers. In accordance with the techniques described in this disclosure, an LDP packet may include a TLV indicating the interface status information of the L2 circuit peer. For example, access node 400 may receive an LDP packet from IFC 408A that establishes an L2 circuit with the first L2 circuit peer, e.g., PE device 12A of FIG. 1. The LDP packet may include a TLV indicating the interface status information of PE device 12A, such as the status of the customer-facing interface of PE device 12A.

In response to receiving interface status information that indicates the status of the customer-facing interface of PE device 12A is marked down, RPD 442 of access node 400 may configure a different L2 circuit as the hot-standby. This has the effect of switching the traffic to the new hot-standby L2 circuit in a relatively short time period, such as on the order of seconds. For example, routing information 430 may be configured to indicate that L2 circuit 17B connected to PE device 12B as the "active" L2 circuit. Routing engine 404 of access node 400 analyzes routing information 430 and generates forwarding information 450 in accordance with routing information 430 that causes access node 400 to forward traffic to PE device 12B. In this way, when access node 400 receives traffic from CE device 8A, access node 400 may determine from forwarding information 450 to send the traffic to IFC 408B, which outputs the traffic on the second L2 circuit (e.g., L2 circuit 17B) that is connected to PE device 12B.

Figure 5:
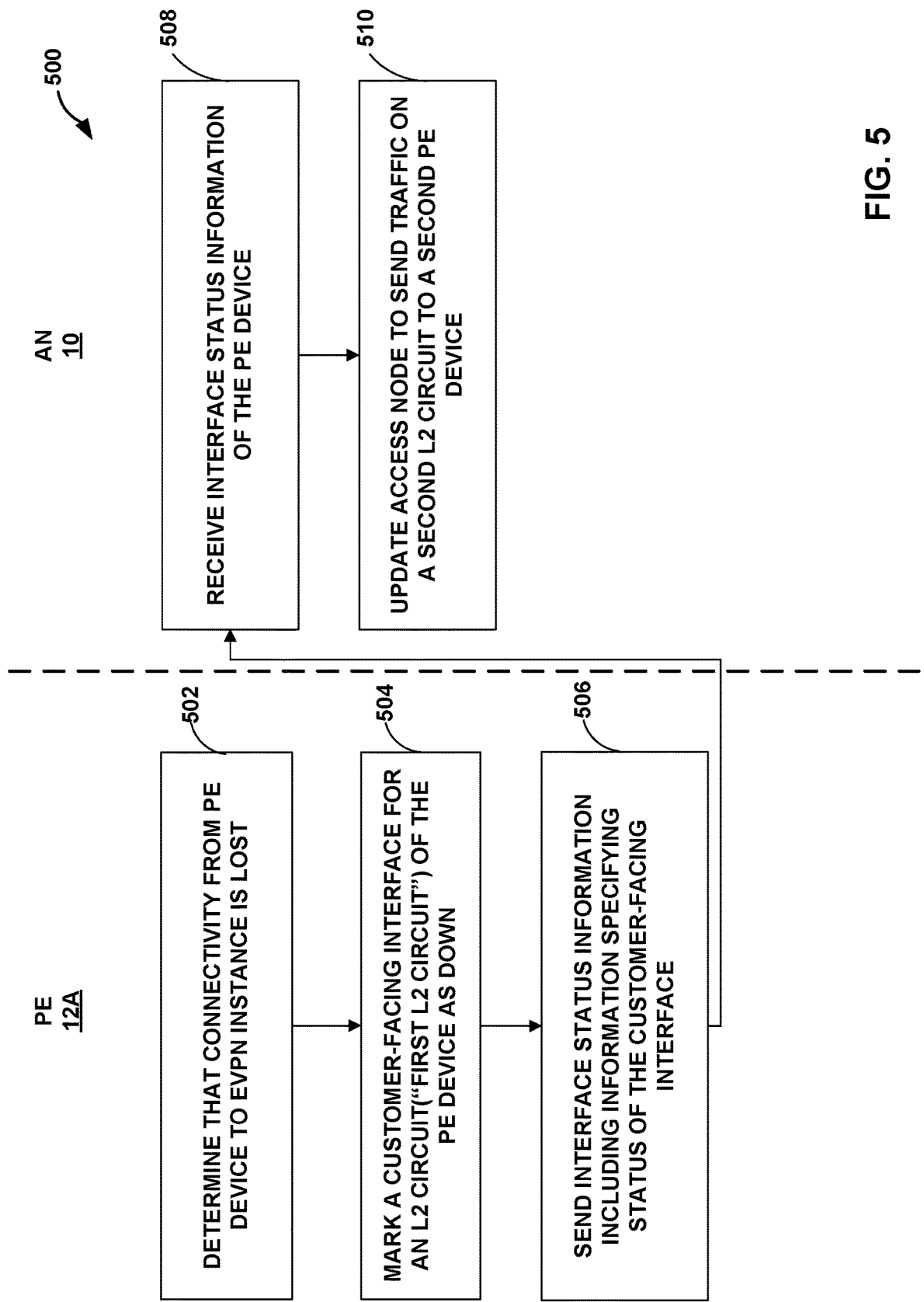
FIG. 5 is flowchart illustrating an example operation of network devices for providing L2 circuit failover in the event connectivity to an EVPN instance is lost, in accordance with the techniques described in this disclosure.

In some examples, routing engine 404 may use MEP 434 to send and receive CFM messages (e.g., message 26 of FIG. 2) including interface status information. For example, routing engine 404 may configure access node 400, along with PE device 12A, as a Maintenance Association End Point such that access node 400 may establish a CFM session to monitor the interface status of PE device 12A. Similarly, routing engine 404 may configure access node 400, along with PE device 12B, as a Maintenance Association End Point such that access node 400 may establish a CFM session to monitor the interface status of PE device 12A. With the CFM sessions, each of PE devices 12A, 12B may communicate CFM messages to AD 10 regarding their interface status. For instance, routing engine 404 of access node 400 may use CCP 436 to periodically send CFM messages, such as every few milliseconds, to monitor the status of the customer-facing interface of the other Maintenance Association End Point, e.g., PE device 12A. Routing engine 404 may also use MEP 434 to receive CFM messages that may include interface status information from an L2 circuit peer. For example, access node 400 may receive a CFM message including interface status information including information specifying the status of the customer-facing interface of PE device 12A. In response to receiving a CFM message including the interface status information, routing engine 404 may configure forwarding information 450 to include next hop weights 452 that cause access node 400 to forward traffic received from the CE device to a higher or lower weighted next hop, e.g., PE device 12B of FIG. 1. This has the effect of switching the traffic to the new L2 circuit in a shorter time period than global repair, such as on the order of milliseconds. For example, global repair has the effect of switching the traffic to the new hot-standby L2 circuit in the order of seconds (e.g., resulting from the load of the control plane of PE device 12A), whereas local repair exchanges CFM messages within milliseconds. access node FIG. 5 is flowchart illustrating an example operation of network devices configured to provide L2 circuit failover in the event connectivity to an EVPN instance is lost, in accordance with the techniques described herein. Operation 500 is described with respect to PE device 12A and access node 10 of FIG. 1, and PE device 300 and access node 400 of FIGS. 3-4, but may be performed by any of the network devices.

In the example of FIG. 5, PE device 12A may determine that connectivity from PE device 12A to an EVPN instance is lost (502). For example, PE device 12A may use routing protocols 324, such as BFD 327, to exchange keep alive packets within the core network to other PE devices of the core network to determine whether connectivity to the EVPN instance is lost. If PE device 12A does not receive a response to a keep alive packet, PE device 12A may determine that connectivity to the EVPN instance is lost.

In response to determining that the connectivity to the EVPN instance is lost, PE device 12A may also mark its customer-facing interface for the L2 circuit as "down" (504). For example, RPD 342 may inform kernel 320 to mark the customer-facing interface status entry for the L2 circuit of interfaces 322 as "down".

PE device 12A may send, to access node 10 and in response to marking the customer-facing interface as down, interface status information including information specifying status of the customer-facing interface of PE device 12A (506). For example, PE device 12A may use an L2 circuit protocol, e.g., LDP 329, to send an L2 circuit protocol message including the interface status information in the TLV Access node 10 may receive the interface status information of PE device 12A (508) and may update the access node 10 to send traffic on a second L2 circuit, e.g., L2 circuit 17B, connected to PE device 12B (512). For example, access node 10 may update routing information 430 to indicate the other L2 circuit, e.g., L2 circuit 17B, is the "active" L2 circuit. Routing engine 404 generates forwarding information 450 in accordance with routing information 430 that causes access node 10 to forward traffic to PE device 12B via L2 circuit 17B. In this way, when access node 10 receives traffic from CE device 8A, access node 10 may determine from forwarding information 450 to send the traffic to an interface for L2 circuit 17B.

Figure 6:
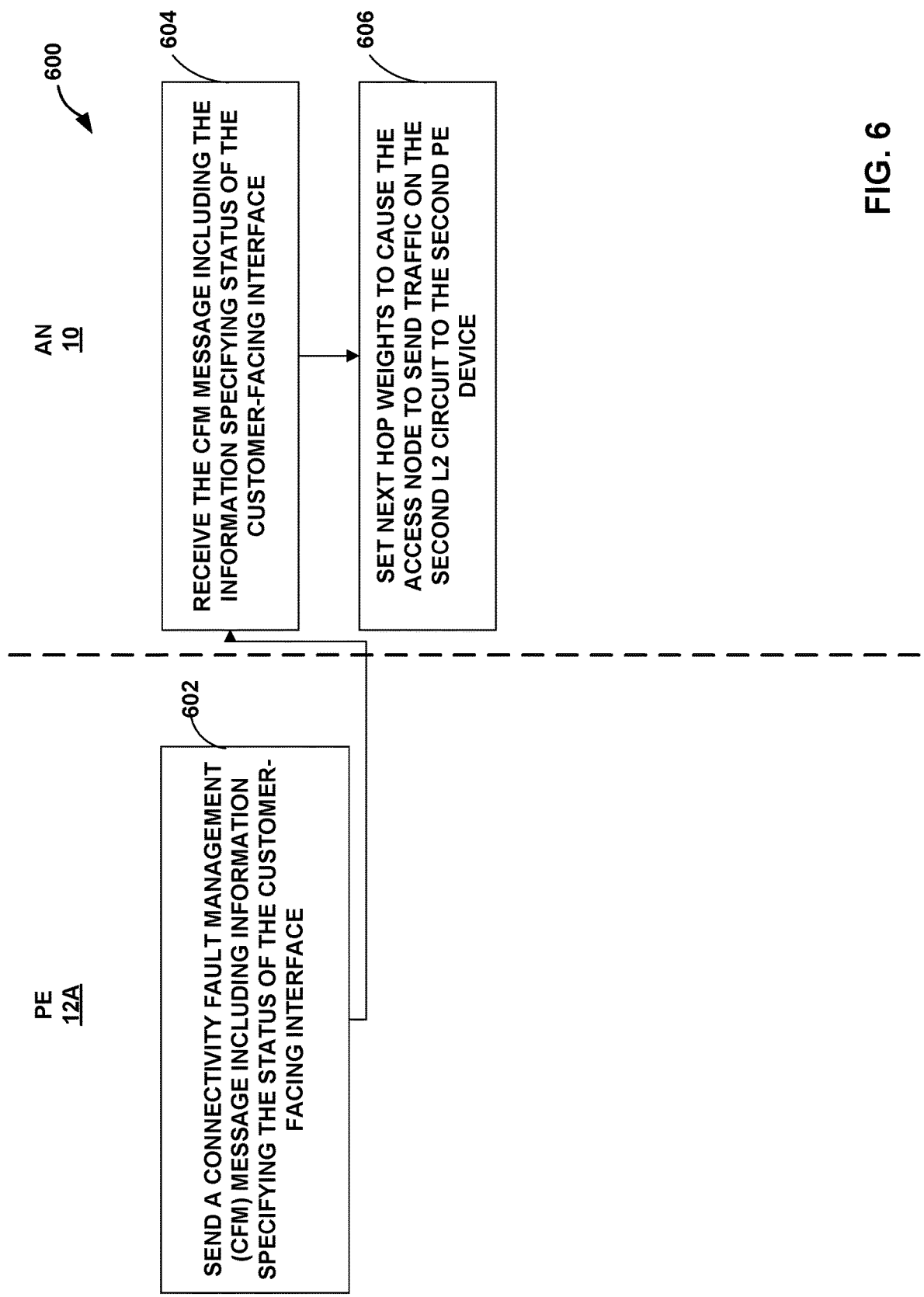
FIG. 6 is a flowchart illustrating an example of additional operation of network devices for providing L2 circuit failover in the event connectivity to an EVPN instance is lost, in accordance with aspects of the techniques described in this disclosure.

FIG. 6 is a flowchart illustrating an example of additional operation of network devices for providing L2 circuit failover in the event connectivity to an EVPN instance is lost, in accordance with aspects of the techniques described in this disclosure. Operation 600 is described with respect to PE device 12A and access node 10 of FIG. 1, and PE device 300 and access node 400 of FIGS. 3-4, but may be performed by any of the network devices. The operation described in FIG. 6 may be performed concurrently with the global repair operation as described in FIG. 5.

In the example of FIG. 6, PE device 12A may send a connectivity fault management message including a type, length, value indicating the status of the core-facing interface and the status of the customer-facing interface (602). For example, access node 10 may establish a CFM session with PE device 12A from which PE device 12A may send a CFM message based on the Continuity Check Protocol 336 including a TLV including information specifying the status of the core-facing interface and status of the customer-facing interface of PE device 12A. An administrator may create an event of an CFM action profile such that access node 10 may monitor whether CFM messages include the interface status information.

Access node 10 may receive the CFM message including the information specifying status of the customer-facing interface (604). For example, access node 10 may receive from PE device 12A the CFM message including the TLV including information specifying the status of the customer-facing interface for the L2 circuit as "down."

In response to receiving the CFM message including the interface status information, access node 10 sets next hop weights to cause the access node to send traffic on the second L2 circuit (e.g., L2 circuit 17B) to the second PE device (e.g., PE device 12B) (606). For example, routing engine 404 may configure forwarding information 450 of access node 10 to include next hop weights 452 that cause the access node to forward traffic received from a CE device to PE device 12B, e.g., the higher weighted next hop.

The techniques of this disclosure may be implemented in a wide variety of devices or apparatuses, including a network device, an integrated circuit (IC) or a set of ICs (i.e., a chip set). Any components, modules or units have been described provided to emphasize functional aspects and does not necessarily require realization by different hardware units. The techniques described herein may also be implemented in hardware or any combination of hardware and software and/or firmware. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable storage medium comprising instructions that, when executed in a processor, performs one or more of the methods described above. The computer-readable storage medium may be a physical structure, and may form part of a computer program product, which may include packaging materials. In this sense, the computer readable medium may be non-transitory. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

What is claimed is:

1. A method comprising:
    receiving, by an access node of an access network and from a first provider edge (PE) device of a plurality of PE devices, interface status information of the first PE device specifying a down status of a customer-facing interface of the first PE device for a first layer 2 (L2) circuit that connects the first PE device and the access node, wherein the access node is multi-homed to the plurality of PE devices configured with an Ethernet Virtual Private Network (EVPN) instance reachable by an Ethernet segment connecting the plurality of PE devices to the access node over the Ethernet segment; and
    updating, by the access node and in response to receiving the interface status information of the first PE device specifying the down status of the customer-facing interface, the access node to send traffic on a second L2 circuit that connects the access node to a second PE device of the plurality of PE devices configured with the EVPN instance.

2. The method of claim 1,
    wherein receiving interface status information comprises receiving an L2 circuit protocol message including the interface status information within a Type, Length, Value (TLV) of the L2 circuit protocol message, and wherein updating the access node to send traffic on the second L2 circuit comprises:

updating, by the access node and in response to receiving the L2 circuit protocol message, a status of the second L2 circuit to an active L2 circuit to send traffic on the second L2 circuit.

3. The method of claim 1, wherein receiving interface status information comprises receiving a Connectivity Fault Management (CFM) message including the interface status information; and wherein updating the access node to send traffic on the second L2 circuit comprises:

setting, by the access node and in response to receiving the CFM message, a weighted next hop to the second PE device to cause the access node to send traffic on the second L2 circuit to the second PE device.

4. The method of claim 3, wherein receiving the CFM message comprises receiving the CFM message including a Type, Length, Value (TLV) including the interface status information.

5. The method of claim 3, wherein setting the weighted next hop to the second PE device comprises:

setting a higher weighted next hop to the second PE device; and setting a lower weighted next hop to the first PE device.

6. The method of claim 4, wherein the access node and the first PE device are each configured as a Maintenance Association End Point (MEP) to implement a Continuity Check Protocol (CCP) to configure the CFM message including at least the TLV including the interface status information.

7. The method of claim 1, further comprising:

subsequent to updating the access node to send traffic on the second L2 circuit, receiving, by the access node, traffic from a customer edge (CE) device connected to the access node; and forwarding, by the access node, the traffic on the second L2 circuit to the second PE device.

8. An access node of an access network that is multi-homed to a plurality of provider edge (PE) devices configured with an Ethernet Virtual Private Network (EVPN) instance reachable by an Ethernet segment connecting the plurality of PE devices to the access node over the Ethernet segment, comprising:

a memory; and one or more processors coupled to the memory, wherein the one or more processors are configured to:

receive, from a first PE device of the plurality of PE devices, interface status information of the first PE device specifying a down status of a customer-facing interface of the first PE device for a first layer 2 (L2) circuit that connects the first PE device and the access node; and update, in response to receiving the interface status information of the first PE device specifying the down status of the customer-facing interface, the access node to send traffic on a second L2 circuit that connects the access node to a second PE device of the plurality of PE devices configured with the EVPN instance.

9. The access node of claim 8, wherein, to receive interface status information, the one or more processors are further configured to receive an L2 circuit protocol message including the interface status information within a Type, Length, Value (TLV) of the L2 circuit protocol message, and wherein to configure update the access node to send traffic on the second L2 circuit, the one or more processors are further configured to:

configure, in response to receiving the L2 circuit protocol message, the second L2 circuit as an active L2 circuit to send traffic on the second L2 circuit; and configure the first L2 circuit to operate in Hot-Standby Mode.

10. The access node of claim 8, wherein, to receive interface status information, the one or more processors are further configured to:

receive a Connectivity Fault Management (CFM) message including the interface status information, and wherein, to update the access node to send traffic on the second L2 circuit, the one or more processors are further configured to:

set, in response to receiving the CFM message, a weighted next hop to the second PE device to cause the access node to send traffic on the second L2 circuit to the second PE device.

11. The access node of claim 10, wherein the CFM message includes a Type, Length Value (TLV) including the interface status information.

12. The access node of claim 11, wherein a CFM session operating in distributed mode is established between the access node and the first PE device to communicate the CFM message including the interface status information.

13. The access node of claim 11, wherein the one or more processors are further configured to:

receive traffic from a customer edge (CE) device connected to the access node; and forward the traffic on the second L2 circuit to the second PE device.

* * * * *